Sept. 8, 1931. E. LETSCH 1,822,662
PRECISION MEASURING INSTRUMENT
Filed Nov. 24, 1926
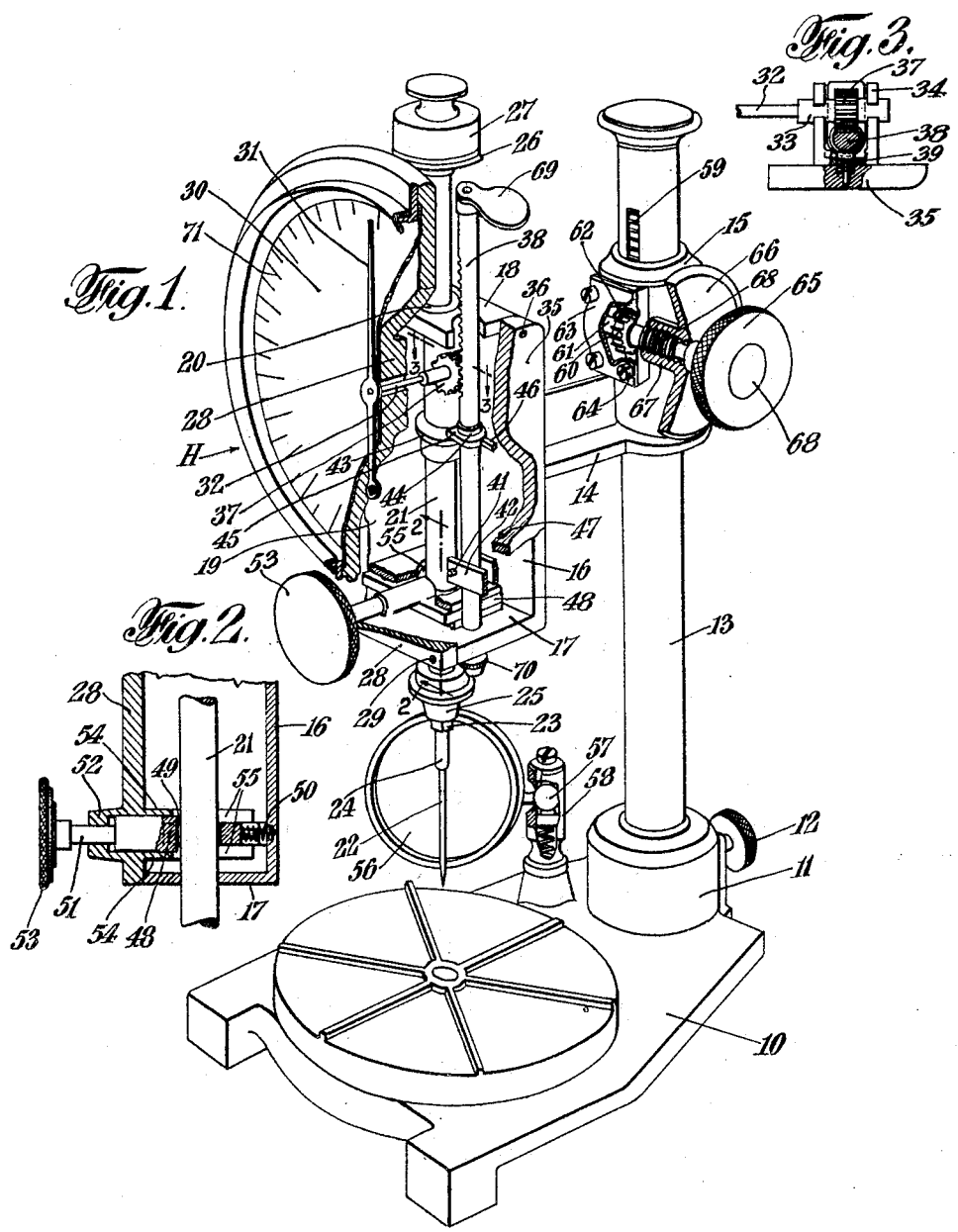

Patented Sept. 8, 1931

1,822,662

UNITED STATES PATENT OFFICE

EUGENE LETSCH, OF LYNBROOK, NEW YORK, ASSIGNOR, BY MESNE ASSIGNMENTS, TO PRECISION SCIENTIFIC COMPANY, A CORPORATION

PRECISION MEASURING INSTRUMENT

Application filed November 24, 1926. Serial No. 150,400.

My present invention relates to scientific measuring instruments, and while some of the features thereof are of broad and general application it has a preferred field of utility as a penetrometer or an instrument for measuring the hardness or wearing qualities of materials used in building and road construction and in the arts generally.

It is an object of the invention to provide a measuring instrument of rugged construction which shall operate with a high degree of precision, the use of which requires no complicated adjustments and which has no parts apt to become out of order.

Another object is to provide an instrument of the type mentioned in which mistakes as to the zero position thereof or the need of calibration or allowance for inaccuracies in the setting of such zero position are entirely eliminated, yet, without requiring that the object or specimen to be measured or tested be of approximately predetermined thickness or width.

Another object is to provide a load or thrust actuated instrument of the type mentioned in which are avoided the inaccuracies in the reading due to variable load and friction of the registering mechanism.

Another object is to provide an instrument of the above type in which the load due even to a rugged registering mechanism need not be compensated for to assure accurate reading.

It is a feature of the invention to provide broadly a pressure or thrust actuated measuring instrument, such as, for instance, a penetrometer, operating entirely free from the load of the registering device. Distinct operating means is provided for advancing the registering device of the instrument, the position of the pressure actuated device limiting and therefore determining the reading of the register.

In a preferred embodiment of penetrometer, the pressure actuated element is a rod slidable in a casing and carrying the stylus at its lower end, a weight preferably applying the predetermined pressure thereto. The dial has a pointer provided with a pinion operated from a rack bar parallel to the rod and preferably manually depressed, said rod having preferably a collar acting as a stop coacting with a part on the rack bar in order thereby to determine the reading.

In a preferred embodiment the entire instrument head with the dial is mounted on a bracket having a sleeve encircling a support post carried on the support base of the instrument. By means of a rack and pinion construction the entire bracket and operating head may be slightly raised or lowered along the support post to dispose the stylus point in accurate contact with the surface of the object or specimen to be tested.

In the accompanying drawings in which is shown one of the various possible embodiments of the several features of the invention Fig. 1 is a perspective view of the instrument with parts shown broken away to better disclose the interior construction, Fig. 2 is a sectional view on a larger scale taken along the line 2—2 of Fig. 1, and;

Fig. 3 is a view similar to Fig. 2, but taken on line 3—3 of Fig. 1.

Referring now to the drawings I have shown a familiar form of base or support plate 10 upon which is to be supported, the specimen or object (not shown) to be tested. In a hub 11 in one end of the base there is secured by means of a set screw 12 a support post 13 which carries the operating head H of the instrument. The head preferably comprises a bracket arm 14 having a collar or mounting hub 15 encircling the post and secured therto by means to be described hereafter.

The outer end of the bracket has secured thereto by screws (not shown) a casing, the back wall 16, the bottom wall 17, the top wall 18, and the one lateral wall 19 of which are preferably welded or soldered together in a unitary construction. Through appropriate bushings 20 in the upper and lower wall of the casing there extends the operating rod 21, the lower protruding end of which has attached thereto the stylus 22 which in test penetrates the object or specimen therebelow. The stylus attachment is preferably retained in position by means of a split collet 23 encircling the thickened holder rod 24 within which the stylus is welded, and gripped thereto by a fastening screw collar 25 threaded upon the spring collet by screw threads, in themselves not material to this invention and therefore not shown. The upper end of the stylus rod 21 is formed with a pan 26 for removably supporting any desired weight 27 by which the required penetrating impulse upon the rod and stylus are effected.

The front wall 28 of the casing is secured in position upon the front of the open case by screws 29 and has riveted thereto the dial 30 of the instrument. The dial is provided with a pointer 31 affixed on the end of the horizontal axle 32 which in turn is supported by bushings 33 in a bracket construction 34 riveted to the upper part of the side panel 35 which latter is secured by appropriate screws 36 in position to close the right side of the casing.

The pinion 37 cooperates with the rack teeth of a rack bar 38 assembled with and extending longitudinally of the side wall 35. The upper end of the rack bar protrudes from the top 18 of the casing and has a finger piece 69. The lower end protrudes from the bottom 18 and has a stop nut 70 screwed thereon. The rack bar is urged at its upper end into mesh with the pinion by a spring-pressed plunger 39 between the jaws of the support bracket 34, and a similar spring-pressed plunger (not shown) resiliently maintains it in relation of parallelism against a cross pin 41 connected between a pair of support brackets 42 soldered to the side wall 35 near the lower end thereof.

The stylus rod has a collar 43 pinned thereto and the rack bar has a collar 44 similarly pinned thereto and provided with a lateral lug 45 extending directly above a part of said collar 43. The collar 44 is also provided with a tooth 46 movable in a corresponding longitudinal groove 47 in the casing wall 35 in order to maintain the rack bar against rocking displacement about its longitudinal axis and thereby preventing the possibility of binding against the pinion teeth.

The stylus is normally maintained in any fixed set position by means of a clutch comprising a thick metal plate 48 having a hole 49 encircling the stylus rod 21 with clearance. The clutch is normally held engaged and in operative position by a coil spring 50 which reacts against the rear wall of the casing and presses the clutch plate against one side of the stylus rod.

For releasing the clutch there is provided thereon an integral rod extension 51 protruding through a corresponding boss 52 in the cover plate 28, a push button 53 being mounted at the free end of said rod immediately below the dial as shown.

The aperture 49 of the clutch plate clears stylus rod 21, when push button 53 is pushed in as far as it will go, to the limit determined by engagement of the clutch plate with rear wall 16.

Preferably the cover plate 28 of the casing has soldered thereto a yoke comprising a pair of parallel plates 54 which straddle between them the clutch plate 48 and which are cut away at their outer edges at 55 to clear the stylus rod 21. This construction affords a bearing guide for the movement of the clutch plate and precludes jamming thereof both in the release and in the automatic spring setting of the clutch.

The specimen support base of the instrument is preferably provided with the usual mirror 56 mounted by a ball and socket universal joint 57 upon a standard 58, the correct initial engagement of the stylus point with the surface of the specimen to be tested being noted in well-understood manner by the assistance of said mirror.

In order to initially set the stylus with respect to the specimen to be tested, I have shown means for delicately adjusting the position of the entire instrument head H and its bracket together with the stylus carried thereby with respect to the mounting post 13. For this purpose a rack and pinion construction is provided comprising a fixed rack 59 extending longitudinally of the post and a pinion 60 carried in the mounting hub 15 of the support bracket for the instrument head. Preferably the pinion 60 is rigid on a horizontal axle 61 and extends through a corresponding aperture 62 in the mounting hub into mesh with the rack. The axle 61 has a split bearing, one part of which is formed in the hub and the other part of which in a hub cap 63 which is arched to accommodate the outer part of the pinion and which is secured in position by means of screws 64. A screw (not shown) is preferably threaded upon the rear end of the pinion axle 61 to close the aperture provided thereat. The axle 61 has preferably pinned thereto an operating knob 65 readily accessible from the side of the instrument, by the rotation of which it will be apparent that the pinion is turned and the head of the instrument will be raised or lowered in delicately controlled degree until, by the aid of mirror 56, the surface engagement of the stylus point with the specimen is noted.

Thereupon a jamb nut 66 having a hub 67 screwed as at 68 upon the protruding end of the axle 61 is tightened against the bracket hub 15 to securely retain the head in adjusted position.

In operation the instrument having first been set in manner just described, the desired weight 27 is placed upon the pan 26 on top of the stylus rod. Thereupon the operator presses upon push button 53 to release clutch 48, and he sustains the pressure for the predetermined test period, thirty seconds, one minute, two minutes, or more, whereby the weight of the stylus rod with the superadded weight 27 on its pan is exerted against the specimen for the desired period through the stylus point. When the test period has elapsed the operator simply releases the pressure on the button 53 and the clutch immediately engages the stylus rod which with the stylus is retained against either downward or return movement.

The operator then reads the dial after simply depressing the finger piece 69 as far as it will go. In this depression it will be seen that the rack bar 38 moves with its collar 44 until the lug 45 contacts the upper face of collar 43 on the stylus rod, thereby rotating the pinion 37 and with it the pointer 31 through an arc, thus determined entirely by the position of the stylus bar collar 43 and therefore by the degree of penetration of the stylus bar. A sharp fixed reading is immediately and precisely noted, upon the dial which may have graduations 71 according to any desired arbitrary scale.

To return the instrument to zero or initial setting the finger-piece 69 is simply raised manually until the pointer has returned to zero. The pointer will remain in its zero setting since the rack bar 38 is urged against the pinion 37 by the spring-pressed plungers previously described with a force sufficient to prevent shifting of the pinion or pointer except under manual impulse applied to the finger piece 69.

By the construction set forth it will be seen that the thrust due to the weight 27 upon the stylus rod with the added weight of the rod itself are efficiently applied at the point of the stylus 22 without the introduction of any irregular frictional load and consequent disturbances of the reading, due to the operating load of the registering mechanism. The thrust applying instrumentality furnishes an accurate stop by which the pointer setting mechanism is accurately arrested in accordance with the penetration of the stylus.

By forming the registering mechanism independently of the penetrating mechanism so that the load of operating the register is not imposed upon the penetrating device, I am relieved of the necessity of providing a light and correspondingly delicate and expensive registering mechanism; but on the contrary I am enabled to employ a registering construction of considerable ruggedness, durability, and reliability.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters-Patent is:

1. A measuring instrument comprising a base, a vertical rod supported thereabove, means to load said rod for effecting depression thereof, a dial, a pointer therefor, and a rod parallel to said first rod, provided with a finger piece for manual actuation thereof, a stop on said first rod for limiting the depression of said second rod and a rack and pinion connection between said second rod and said pointer.

2. A penetrometer including a specimen support base, a post thereon, a casing carried by said post, a rod extending vertically through said casing, said casing affording a bearing for said rod, a stylus at the lower end of said rod, means for subjecting said rod to a predetermined load, said instrument including a dial having a pointer, a manually actuated rack bar in said casing, a pinion coacting therewith and operating said pointer and coacting stop means on said rod and said rack bar for determining the reading.

3. A penetrometer including a specimen support base, a post extending upward therefrom, a casing having a support bracket by which it is mounted upon said post, a rod having a bearing support in said casing and carrying a stylus at its lower end, a weight support platform on top of said rod, a clutch normally retaining said rod against movement, manual means for releasing said clutch, said instrument including a dial, an indicating pointer on said dial having an operating pinion, a rack bar coacting with said pinion and supported in said casing, a finger piece on said rack bar by which the same is depressed for moving said pointer, and coacting stop means on said rod and said stop bar for limiting the depression of said rack bar.

4. A measuring instrument including a support base, a support post thereon, a bracket mounted upon said post, a casing carried by said bracket, a dial mounted on said casing, a pointer on said dial, an object contacting device protruding downward from the lower end of said casing, manually adjustable means for moving the entire casing with its bracket along the rod to set the contacting device into proper initial relation with the object to be measured, a clutch for nominally retaining the contacting device in fixed position relative to the casing, and manual means to release the clutch for setting the instrument into operation.

5. A penetrometer including a specimen support base, an upstanding post thereon, a support casing having a bracket mounted upon said post, a penetrometer stylus protruding below said casing, an operating rod carrying said stylus and having bearings in said casing, means for subjecting said rod to a predetermined load, a clutch at the lower part of said casing normally retaining said rod against displacement, a dial mounted on said casing, said dial having a pointer provided with an operating pinion within said casing, a rack bar for actuating said pinion, and coacting stop means on said rod and said rack bar by which the displacement of the latter effects a setting of the pointer corresponding to the degree of penetration of the stylus.

6. In a penetrometer, the combination of a casing, a dial on said casing, said dial having a pointer, a shaft extending into said casing from said pointer, a pinion on said shaft, a rack bar extending vertically through said casing and coacting with said casing, a finger piece at an exposed end of said rack bar, a stylus carrying rod parallel to said rack bar having its bearing in said casing, a stop collar on said rod and a stop on said rack bar above said stop collar and limiting the degree of manual depression of the rack bar.

7. A penetrometer including a casing, a dial on said casing, said dial having a pointer, a shaft extending into said casing from said pointer, a pinion on said shaft, a rack bar extending vertically through said casing and coacting with said casing, a finger piece at the upper end of said rack bar, a stylus carrying rod parallel to said rack bar having its bearings in said casing, a stop collar on said rod and a stop on said stop collar and limiting the degree of manual depression of the rack bar, and a finger released spring-closed clutch in said casing normally retaining the rod in fixed position.

8. A measuring instrument including a support base, a post thereon, a measuring head, a support bracket therefor upon said post and means for setting said head with respect to the object to be tested, said means comprising a rack longitudinally of said post, a pinion carried in the support bracket and coacting with said rack, means for manually rotating said pinion to shift the elevation of the entire head and a jamb nut for locking said pinion in fixed position.

9. A measuring instrument including a support base, a post thereon, a measuring head carried by said post and means for setting said head with respect to the object to be tested, said means comprising a support collar about said post, a pinion carried in said support collar and having bearings therein, said pinion extending through a corresponding aperture in said support collar into coaction with said rack, a coacting bearing member secured to said collar for locking the pinion in position, an exposed operating knob for rotating said pinion and an exposed jamb knob for locking said pinion in fixed position.

10. A measuring instrument including a support case having a rod supported and guided in the end walls thereof, said support case having a distinct lateral wall secured thereto, said lateral wall having pre-assembled thereto a rack bar and a coacting pinion having a protruding shaft, said casing having a front wall secured thereto, with a dial fixed to said front wall, said shaft extending in the assembled construction through the central aperture of said dial, and serving to mount the dial pointer.

11. A penetrometer including a base, a support rod thereon, a case carried on said rod about said base, an operating rod extending vertically through said case and having a penetrometer stylus at the lower end thereof, a dial carried on said case, a pointer cooperating therewith, a manually operated transmission member carried by said case for shifting said pointer to a limiting position determined by said rod, and means for raising and lowering the case together with the rod stylus and manual pointer operating member in order to initially set the stylus point in correct relation with respect to the specimen to be tested.

Signed at New York in the county of and State of New York this 23rd day of November, A. D. 1926.

EUGENE LETSCH.